United States Patent [19]

Adolph et al.

[11] 4,250,535

[45] Feb. 10, 1981

[54] ELECTRIC SWITCH GEAR SECTION

[75] Inventors: Erich Adolph, Frankfurt am Main; Ünal Bayrak, Bischofsheim; Robert Prohl, Nidderau; Gerhard Schmidt, Darmstadt-Wixhausen; Walter Stecker, Heusenstamm, all of Fed. Rep. of Germany

[73] Assignee: Siemens Aktiengesellschaft, Munich, Fed. Rep. of Germany

[21] Appl. No.: 32,007

[22] Filed: Apr. 20, 1979

[30] Foreign Application Priority Data

Apr. 28, 1978 [DE] Fed. Rep. of Germany ....... 2818905

[51] Int. Cl.³ .............................................. H02B 1/04
[52] U.S. Cl. .................................... 361/335; 361/341
[58] Field of Search ............... 361/331, 332, 334, 335, 361/341, 429

[56] References Cited

U.S. PATENT DOCUMENTS 3,767,976  10/1973  Graybill ............................... 361/335
3,891,862   6/1975  Clark ................................... 361/335

Primary Examiner—Gerald P. Tolin
Attorney, Agent, or Firm—Kenyon & Kenyon

[57] ABSTRACT

An electric switchgear having an understructure without insulating gas is provided with a metal encapsulation for each phase which consists of two containers filled with insulating gas. A vacuum switching tube is vertically disposed in one container. The switching tube is connected on one end to cable terminations and on the other end, via a flexible ribbon and a bolt to a disconnect switch. The disconnect switch is located in the other container which also encloses a bus bar. The movable contact of the disconnect switch can be rotated into a mating contact at the bus bar, into a grounding contact, and into an intermediate position.

11 Claims, 2 Drawing Figures

ELECTRIC SWITCH GEAR SECTION

BACKGROUND OF THE INVENTION

1. Field of the Invention

This invention relates to encapsulated, gas-filled electric switchgear sections in which each phase has at least one vacuum switching tube, as well as separable, axially disposed current connections and a three position disconnect switch having a connection movable into contact with a bus bar or a grounding contact or into a neutral position.

2. Discussion of the Prior Art

An electric switchgear section of the type mentioned above is described in British Pat. No. 11 41 962.

It is an object of the present invention to provide an electric switchgear section of this general type which requires less maintenance and is easier to maintain, while, at the same time, providing substantially shorter current paths and requiring a considerably smaller volume of insulating gas.

SUMMARY OF THE INVENTION

These problems are solved, in accordance with the teachings of the invention, by means of a gas-tight metal encapsulation containing a vacuum switch, the lower end of which is carried on and is connected, through an insulating plate, to a metal plate to which cable terminations may be detachably fastened. The gas tight, insulating feedthrough plate is supported by separate top part carried by an under structure, or frame, which, as well as a cable shield surrounding the terminations, can be parted to permit ready access. The understructure is common to all three phases of the section. The body of the encapsulation is a non-magnetic metal tube which rests on the feedthrough plate and which is closed on its upper end by an insulating plate through which a vertical bolt passes to support a movable disconnect switch contact housed in a second, like, metal encapsulation. The movable upper connection of the vacuum switch is connected to the feed-through bolt by means of a flexible lead. The disconnect contact is movable within the gas-tight upper encapsulation into connection with a horizontal bus bar or with ground, and has an intermediate, no-contact position. Other features of the invention will become apparent upon reading of the detailed description which follows.

Use of the understructure makes the cable termination easily accessible. At the same time, the volume of insulating gas required is reduced considerably by making the understructure and the top part free of insulating gas. The overall arrangement makes installation easy. Shortening the current paths, as compared to the known arrangement, saves copper, the material which is customarily used for the current paths.

DETAILED DESCRIPTION OF THE INVENTION

Figure 2:
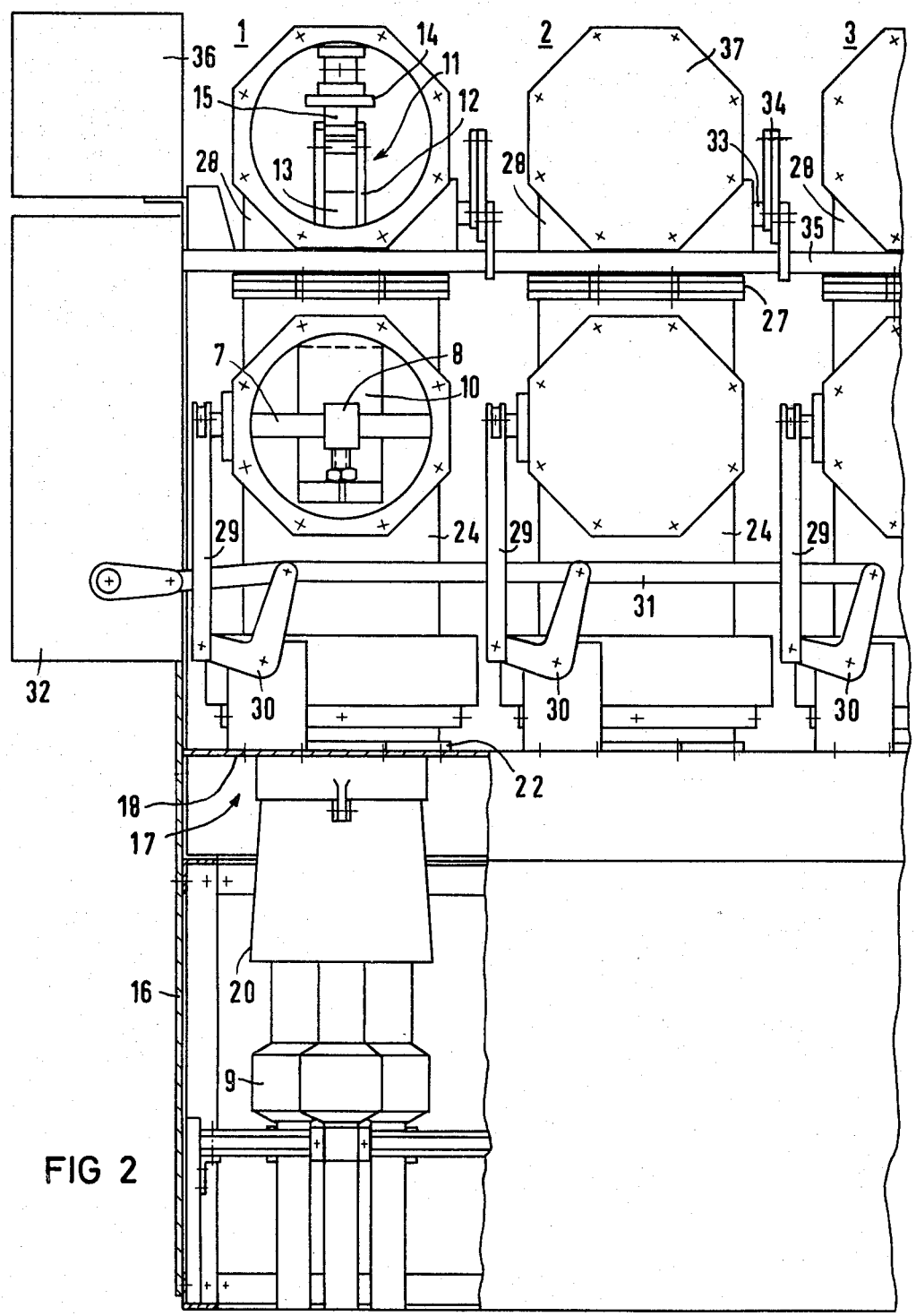
FIG. 2 is a side view showing the switchgear section of FIG. 1 in place with other, like sections.

The switchgear section has an insulating-gas-filled metal encapsulation and has three phases 1, 2 and 3 (FIG. 2).

Figure 1:
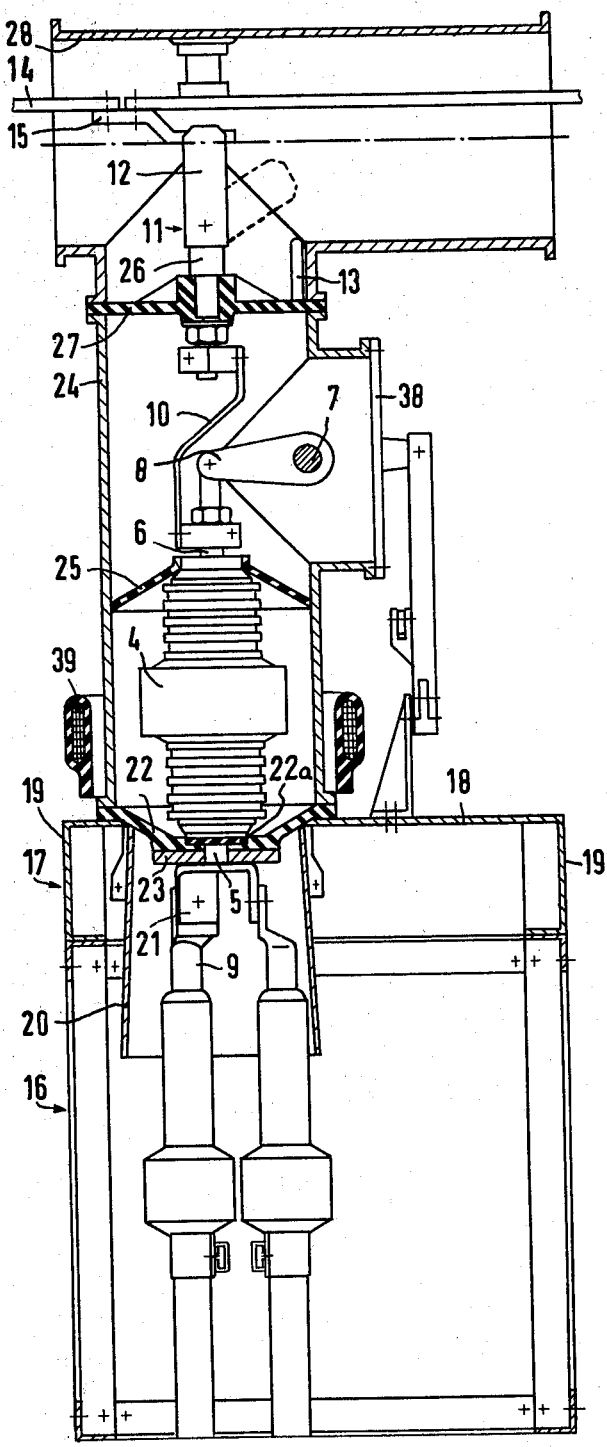
FIG. 1 shows a front view of a switchgear section, partly in cross section.

The interior of a phase can be seen particularly from FIG. 1.

In each phase 1, 2 or 3, the metal encapsulation encloses at least one vacuum switching tube 4 having an axially fixed current connection 5. Vacuum switching tube 4 also has a current connection 6 which is axially movable by means of lever 8 which is linked to a shaft 7, brought out of the encapsulation.

Vacuum switching tube 4 is connected, on the one hand, to cable termination 9 and, on the other hand, via flexible line 10, to disconnect switch 11.

The movable contact 12 of disconnect switch 11 can be swung inside the metal encapsulated onto grounding contact 13, which is connected to the metal encapsulation, and onto mating contact 15, which is connected to bus bar 14.

Cable termination 9 is arranged in understructure 16 which contains no insulating gas and is common to all phases 1, 2, and 3. The understructure 16 supports top part 17, which is also common to all phases 1, 2 and 3, and can be parted, preferably, in at least one horizontal plane for ease of assembly; for instance, in that plane in which top side 18 of top part 17 lies. Thus, in the illustrative embodiment, the parting line is made at the transition between top side 18 and side walls 19. Top part 17 is also at atmospheric pressure.

Vertical shields 20 protrude into top part 17 and extend into understructure 16. Each shield 20, which can preferably be divided axially, surrounds screw connections 21 of cable terminations 9, phase by phase, in the understructure 16.

The upper end of each shield 20 is detachably fastened to a feedthrough plate 22 which, in turn, is supported by top part 17. An electrically conducting plate 23 is arranged on the underside of feedthrough plate 22. The end of vacuum switching tube 4 which faces stationary current connection 5 rests, with a gasket 22a interposed, on the upper side of feedthrough plate 22. Also, one end of vertical container 24, which in the present case is a tubular T-section, rests on the top side of feedthrough plate 22.

Container 24 contains a disc of insulating material 25, for centering vacuum switching tube 4. Above disc 25, ribbon conductor 10 connects the movable connection 6 of vacuum switching tube 4 to vertical feedthrough bolt 26.

Bolt 26 passes through bulkhead 27 which hermetically terminates vertical container 24 at the top and protrudes into a transversely arranged container 28 which is mounted, gastight, on bulkhead 27 and contains bus bar 14.

Container 28 is preferably identical to vertical container 24; i.e., it is likewise a T-shaped tube. In this case, the arm of the tubes faces, and is connected to, bulkhead 27. Bus bar 14 extends in the longitudinal direction of the T-bar. Like container 24, container 28 also is made of non-magnetic material, preferably aluminum, and is part of the metal encapsulation.

Bolt 26 supports disconnect switch 11 in container 28. Movable contact 12 of disconnect switch 11 can be swung from the switch positions mentioned above into a separation or no-contact position (shown in broken lines in FIG. 1) situated between ground contact 13 and mating contact 15.

The drive for vacuum switching tube 4 can best be seen in FIG. 2. Shaft 7, as already mentioned, is brought to the outside of the encapsulation, where it carries a plunger 29. Plunger 29 is connected at its free end to one end of angle lever 30. The other ends of angle levers 30 of phases 1, 2, and 3 are linked to a common push rod 31, which is brought to a drive box 32.

The drive of disconnect switch 11 is designed as follows. Movable contact piece 12 of disconnect switch 11, in the present case a switch blade, can be rotated by means of a rotating shaft 33 (FIG. 2, phase 2) which is brought out of the encapsulation. Rotating shaft 33 is coupled directly to contact 12 by means of a pin insulator extending from rotating shaft 33 inside the encapulation 28. On the outside of the encapsulation, rotating shaft 33 carries a connecting lever 34 (FIG. 2, phase 2). Connecting lever 34 is linked to a control shaft 35 which is common to phases 1, 2, and 3 and is brought to drive box 32.

Above drive box 32 there is a relay box 36. Both boxes 32 and 36 are located in front of the section as a protective shield.

It is a particular feature of the encapsulation that each end of transverse container 28 is closed off by a cover 37 as shown in phases 2 and 3 of FIG. 2 unless the container connected to the container of another section. At least one of the covers can be provided with a predetermined rupture point (not shown).

As shown in FIG. 1, the free branch of vertical T-shaped container 24 is closed off by a plate 38 which also advantageously has a rated break point (not shown).

By connecting lines, not shown, at least the vertical containers 24 of all phases of the metal encapsulation can be connected to equalize the pressure.

As can be seen from FIG. 1, vertical container 24 rests, insulated from extension 17, on feedthrough plate 22. Because of this and in view of the fact that container 24 is made of an amagnetic material, current transformer 39 can be placed around container 24. To protect current transformer 39 against interference effects, the grounding contacts 13 of all phases 1, 2, and 3 are not arranged inside this encapsulation but, instead, are outside it and are connected, at a point removed from transformer 39, to a common grounding bar which is electrically connected to understructure 16.

A voltage transformer which concentrically surrounds vacuum switching tube 4 may be arranged in vertical container 24, in a manner not shown.

What is claimed is:

1. In an electric switchgear section having plural phases, of which each phase has metal encapsulation which is adapted to be filled with insulating gas and which encloses at least one vacuum switching tube having a fixed axial current connection and an axial current connection movable by means of a lever turning on a shaft extending out of the encapsulation, the fixed connection being connected to a cable termination and the movable connection being connected, via a flexible lead, to an encapsulated disconnect switch whose movable contact can be swung into contact with a ground or with a mating contact on a bus bar, the improved structure wherein each phase comprises:

the cable termination being located in a top part supported by an understructure both of which are common to all phases and are at atmospheric pressure, the termination having a screw connection and being surrounded by a vertical shield which is removably fastened at its upper end to a feedthrough plate carried by the top part and which extends through the top part into the understructure, there being an electrically conducting plate carried on the underside of the feedthrough plate which is connected to the cable termination and receives the fixed current connection, the feedthrough plate supporting, via an interposed gasket, the fixed connection and the lower end of the vacuum switching tube connected thereto as well as one end of a vertical, non-metallic container forming part of the encapsulation, a disc of insulating material for centering the vacuum switching tube being contained within the container, a bulkhead for closing, gas-tight, the vertical container at the top and having a vertical bolt passing therethrough on the lower end of which is carried the flexible lead connecting the movable connection of the vacuum switching tube and the upper end of which extends into a gas-tight, non-magnetic, horizontal container arranged on the bulkhead for enclosing the bus bar, and the end of the vertical bolt in the horizontal container supporting a movable contact of the disconnect switch for motion between a grounding contact and a bus bar contact.

2. In a switchgear section in accordance with claim 1, the further improvement comprising the shield for each phase being axially divisible.

3. In a switchgear section in accordance with claim 1, the improvement comprising the top part being separable in at least one horizontal plane.

4. In a switchgear section in accordance with claim 1, the further improvement comprising the vertical container and the horizontally disposed container of the encapsulation being of the same design.

5. A switchgear section in accordance with claim 1, further comprising the shaft, where it extends out of the encapsulation, having a plunger and an arm coupled to an angle lever, the free arms of the angle levers of all phases being linked to a common push rod which is brought to a drive box.

6. A switchgear section in accordance with claim 1, wherein the contact of the disconnect switch can be rotated by means of a rotating shaft brought out of the encapsulation, further comprising:

the movable contact of the disconnect switch being a switch blade and the connection between the rotating shaft and the movable contact being a pin insulator inside the encapsulation, and the rotating shaft carrying, outside the encapsulation, a connecting lever which is linked to a control shaft common to all phases and which is brought into the drive box.

7. A switchgear section in accordance with one of the claims 1, 4, 5, or 6, in which the ends of the horizontally disposed metal encapsulation container are each closed off by a cover and at least one of the covers has a predetermined rupture point, and that a predetermined rupture point is likewise arranged in a plate closing off a branch of the vertical container.

8. A switchgear section in accordance with claim 1 in which at least the vertical containers of all phases of the metal encapsulation are connected by lines designed for pressure equalization.

9. A switchgear section in accordance with claim 1 in which the vertical container rests against the top part on the feedthrough plate in an insulated manner and is surrounded by a current transformer, and in which a common grounding bar connected to the understructure is connected outside the encapsulation to the grounding contacts of all phases.

10. A switchgear section in accordance with claim 1 in which a voltage transformer concentrically surrounding the vacuum switching tube is supported by the vertical container.

11. An electric switch gear section having plural phases in which each phase has a metal encapsulation which is adapted to be filled with insulating gas and which encloses at least one vacuum switching tube having a fixed axial current connection and an axial current connection movable by means of a lever turning on a shaft extending out of the encapsulation, the fixed connection being connected to a cable termination and the movable connection being connected, via a flexible lead, to an encapsulated disconnect switch whose movable contact can be swung into contact with the ground or with the mating contact on a bus bar, the improvement comprising:

the cable termination being located on a top part which is supported by an understructure and both of which are common to all phases and are at atmospheric pressure, the top part being separable from the understructure in at least one horizontal plane, the termination having a screw connection and being surrounded by an axially divisible, vertical shield which is removably fastened at its upper end to a feedthrough plate carried by the top part and extends through the top part into the understructure, an electrically conducting plate carried on the underside of the feedthrough plate which is connected to the cable termination and receives the fixed current connection, the feedthrough plate supporting, via an interposed gasket, the fixed connection and the lower end of the vacuum switching tube connected thereto, as well as one end of a vertical, non-magnetic container forming part of the encapsulation, a disk of insulating material inside the container centering the vacuum switching tube and a voltage transformer concentrically surrounding the vacuum switching tube supported by the container, the vacuum switch operating shaft extending out of the encapsulation and being connected via a plunger to an angle lever, the free arms of all phases being linked to a common push rod which is brought to a drive box, there being a bulkhead closing, gastight, the vertical container at the top through which a vertical bolt passes, the lower end of the bolt carrying the flexible lead connecting the movable connection of the vacuum switching tube and the upper end of the bolt extending into a gas-tight non-magnetic, horizontal arranged on the bulkhead for enclosing the bus bar, the end of the vertical bolt inside of the horizontal container supporting a movable contact of the disconnect switch for motion between a grounding contact and a bus bar contact, the contact of the disconnect switch being rotatable by means of a second rotating shaft brought out of the encapsulation by means of a pin insulator extending from a switchblade of the disconnect switch inside the encapsulation to the rotating shaft, there being a connecting lever on the rotating shaft outside the encapsulation which is linked to a control shaft common to all phases and which is brought into the drive box, the vertical container resting against the top part on the feedthrough plate in an insulated manner and being surrounded by a current transformer, and a common grounding bar on the outside of the encapsulation which interconnects the grounding contacts of all phases with the understructure.

* * * * *